(12) United States Patent
Lotspih

(10) Patent No.: US 7,093,851 B2
(45) Date of Patent: Aug. 22, 2006

(54) TUNABLE CONTROL SIDE AIR BAG CUSHION

(75) Inventor: John Anthony Lotspih, Englewood, OH (US)

(73) Assignee: Delphi Technologies, Inc., Troy, MI (US)

( * ) Notice: Subject to any disclaimer, the term of this patent is extended or adjusted under 35 U.S.C. 154(b) by 569 days.

(21) Appl. No.: 09/805,586

(22) Filed: Mar. 13, 2001

(65) Prior Publication Data

US 2002/0130537 A1 Sep. 19, 2002

(51) Int. Cl.
*B60R 21/16* (2006.01)

(52) U.S. Cl. .............. 280/730.2; 297/216.13

(58) Field of Classification Search ........... 297/216.13; 280/730.2, 743.1
See application file for complete search history.

(56) References Cited

U.S. PATENT DOCUMENTS

| | | | | |
|---|---|---|---|---|
| 4,508,294 A | * | 4/1985 | Lorch | 244/122 AG |
| 5,536,038 A | * | 7/1996 | Bollaert et al. | 280/730.2 |
| 5,586,782 A | * | 12/1996 | Zimmerman, II et al. | 280/730.2 |
| 5,618,595 A | * | 4/1997 | Matsushima et al. | 428/35.2 |
| 5,718,450 A | * | 2/1998 | Hurford et al. | 280/730.2 |
| 5,803,485 A | * | 9/1998 | Acker et al. | 280/728.2 |
| 5,884,937 A | * | 3/1999 | Yamada | 280/730.2 |
| 5,895,070 A | | 4/1999 | Crimmins et al. | |
| 5,899,490 A | * | 5/1999 | Wipasuramonton et al. | 280/730.2 |
| 5,941,564 A | * | 8/1999 | Acker | 280/743.2 |
| 5,957,487 A | * | 9/1999 | Stütz | 280/730.2 |
| 6,010,149 A | | 1/2000 | Riedel et al. | |
| 6,056,316 A | * | 5/2000 | Yamaji et al. | 280/730.2 |
| 6,065,772 A | * | 5/2000 | Yamamoto et al. | 280/730.2 |
| 6,095,602 A | * | 8/2000 | Umezawa et al. | 297/216.1 |
| 6,113,135 A | * | 9/2000 | Tsutsumi | 280/730.2 |
| 6,129,377 A | * | 10/2000 | Okumura et al. | 280/730.2 |
| 6,142,507 A | * | 11/2000 | Okuda et al. | 280/730.2 |
| 6,155,596 A | | 12/2000 | Nakajima et al. | |
| 6,170,860 B1 | * | 1/2001 | Denz et al. | 280/730.2 |
| 6,199,898 B1 | | 3/2001 | Masuda et al. | |
| 6,224,091 B1 | | 5/2001 | Eyrainer et al. | |
| 6,237,937 B1 | | 5/2001 | Kokeguchi et al. | |
| 6,244,619 B1 | | 6/2001 | Satzger | |
| 6,349,964 B1 | | 2/2002 | Acker et al. | |
| 6,398,254 B1 | | 6/2002 | David et al. | |

FOREIGN PATENT DOCUMENTS

JP 11-157410 A * 6/1999

* cited by examiner

*Primary Examiner*—Peter M. Cuomo
*Assistant Examiner*—Joseph F. Edell
(74) *Attorney, Agent, or Firm*—Scott A. McBain

(57) ABSTRACT

An air bag assembly in a vehicle having an inflator for generating inflation gas and an air bag cushion deployable upon generation of gas by the inflator. The air bag cushion includes a first inflatable portion which is proximal to the inflator for cushioning the torso of the vehicle occupant. The air bag cushion further includes a second inflatable portion distal from the inflator for cushioning the head of the vehicle occupant. A plurality of expansion restraining elements extend from opposing lateral sides of the air bag cushion at differing latitudes along the air bag cushion between the first and second inflatable portions. The expansion restraining elements extend partially but not completely across the width of the air bag cushion so as to partially restrict the flow of inflation gas from the first inflatable portion into the second inflatable portion while defining the flow path of the inflation gas between the first and second inflatable portions.

20 Claims, 3 Drawing Sheets

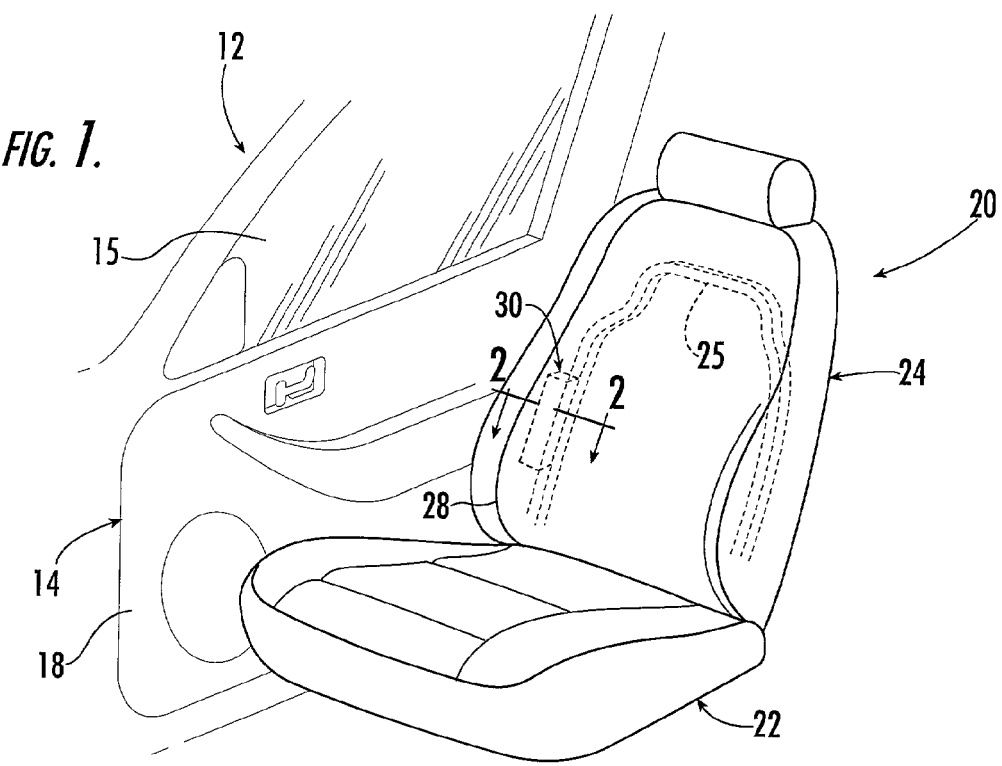
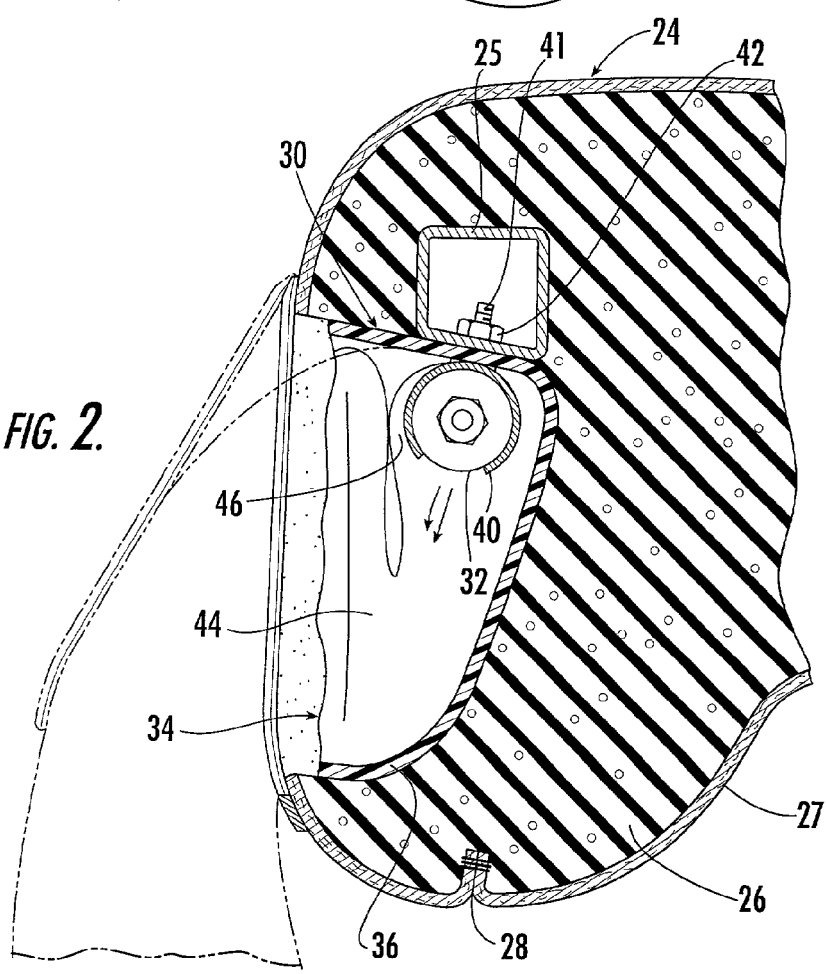

TUNABLE CONTROL SIDE AIR BAG CUSHION

TECHNICAL FIELD

This invention relates to a vehicle air bag assembly, and more particularly to an air bag assembly including portions for the protection of the head and torso of a vehicle occupant during a side collision event.

BACKGROUND OF THE INVENTION

It is well known in motor vehicles to provide an air bag assembly for the protection of a vehicle occupant. Such air bag assemblies typically include an inflatable cushion structure in fluid communication with a gas emitting inflator. Upon the occurrence of predetermined vehicle conditions, such as deceleration exceeding a certain level, a signal is sent via appropriate sensors to the gas emitting inflator thereby causing the inflator to discharge gas into the air bag cushion thereby forcing the air bag cushion outwardly from a stored position into an operative position between the occupant to be protected and the interior portions of the vehicle against which the occupant might otherwise come in contact. The presence of the inflated air bag cushion between the occupant and the interior portions of the vehicle provides a cushioning effect as the occupant impacts the inflated cushion thereby dissipating the kinetic energy of the occupant in a controlled manner.

It is also known to provide an air bag assembly for side impact protection of a vehicle occupant. The prior art has disclosed side impact air bag assemblies which have either one cushion or a plurality of cushions which deploy to protect the head and torso portions of the vehicle occupant. The protection of the vehicle occupants against side impact injury may be desired in a large number of different types of vehicles wherein the interiors of such vehicles may be substantially different. While the prior art configurations of side impact devices have been generally useful in the protection of occupants, the method of establishing the head and torso protection portions of the cushion have not been highly adaptable to a large number of different categories of vehicles with different interior configurations.

SUMMARY OF THE INVENTION

The present invention provides advantages and alternatives over the prior art by providing an air bag assembly having an inflatable air bag cushion which includes a portion for protection of the head of an occupant to be protected and a portion for protection of the torso of an occupant. These portions are separated and defined by inwardly extending expansion restraining elements which extend at different latitudes from opposing lateral sides of the air bag cushion in a staggered arrangement in the region between the head protection portion and the body protection portion such that there is a distance along the length of the cushion between the expansion restraining elements. The longitudinal distance between the latitudinally disposed expansion restraining elements may be varied for different vehicles as necessary to provide the desired deployed configuration for head and torso protection of vehicle occupants in such different vehicles.

These advantages are accomplished in a preferred form of the present invention by providing an air bag assembly in a vehicle having an inflator for generating inflation gas and an air bag deployable upon generation of gas by the inflator. The air bag includes an enclosed upper boundary and lateral sides extending away from the upper boundary. The air bag cushion includes a first inflatable portion which is proximal to the inflator for cushioning the torso of the vehicle occupant. The air bag cushion further comprises a second inflatable portion distal from the inflator for cushioning the head of the vehicle occupant. A plurality of expansion restraining elements extend from opposing lateral sides of the air bag cushion at differing latitudes along the air bag cushion between the first and second inflatable portions. The expansion restraining elements extend partially but not completely across the width of the air bag cushion so as to partially restrict the flow of inflation gas from the first inflatable portion into the second inflatable portion while defining the flow path of the inflation gas between the first and second inflatable portions.

Advantageously, the air bag assembly of the present invention may be configured to adapt to a large number of diverse vehicle types through adjustment of the longitudinal distance between the latitudinally extending expansion restraining elements. That is, by varying the offset of the expansion restraining elements along the length of the air bag cushion, the air bag cushion may be fine tuned to each individual vehicle while nonetheless utilizing the same basic design and construction technique.

According to a potentially preferred aspect of the present invention, the air bag cushion may be formed from a single piece of material by folding such a piece of material upon itself along a predetermined fold line to form a folded structure of two layers and applying perimeter seams around the perimeter of the folded structure to define a gas receiving enclosure. A plurality of expansion restraining elements are applied in a latitudinally extending direction partially but not completely across the width of the enclosed cushion structure from opposing lateral sides thereof in a generally staggered configuration. The expansion restraining elements may comprise internal sewn, welded, or adhesively bonded seam connections between the layers of the folded structure.

It is a feature of the present invention that the expansion restraining elements may be applied at the time that the connective perimeter seams are applied and may be of structurally similar character to such connective perimeter seams thereby simplifying the construction process.

It is a further feature of the present invention that the basic design of the air bag cushion may be utilized for deployment in a large number of diverse vehicle types through adjustment of size and spacing between the expansion restraining elements.

In accordance with another potentially preferred feature of the invention, the folded and seamed configuration of the air bag cushion utilizes a small number of substantially straight seams so as to further reduce complexity in the manufacturing process.

According to still a further potentially preferred feature of the present invention, the folded and seamed structure of the air bag cushion is such that inflation gas entering the air bag cushion is directed primarily against a non-seamed portion of the air bag cushion within the body protection portion thereof. The inflation gas is thereafter directed in a substantially curved path around the expansion restraining elements so as to bring the head protection portion of the air bag cushion into operative position adjacent the occupant to be protected in a highly efficient manner.

BRIEF DESCRIPTION OF THE DRAWINGS

The present invention will now be described by way of example only, with reference to the accompanying drawings which constitute a part of the specification herein and in which:

FIG. 1 is a perspective view of a vehicle interior partially broken away and including an air bag assembly in an undeployed state located in a vehicle seat;

FIG. 2 is a section view as taken along line 2—2 of FIG. 1 and showing the air bag module in the undeployed condition in solid lines and illustrating the air bag cushion in the deployed condition in phantom lines;

Figure 3:
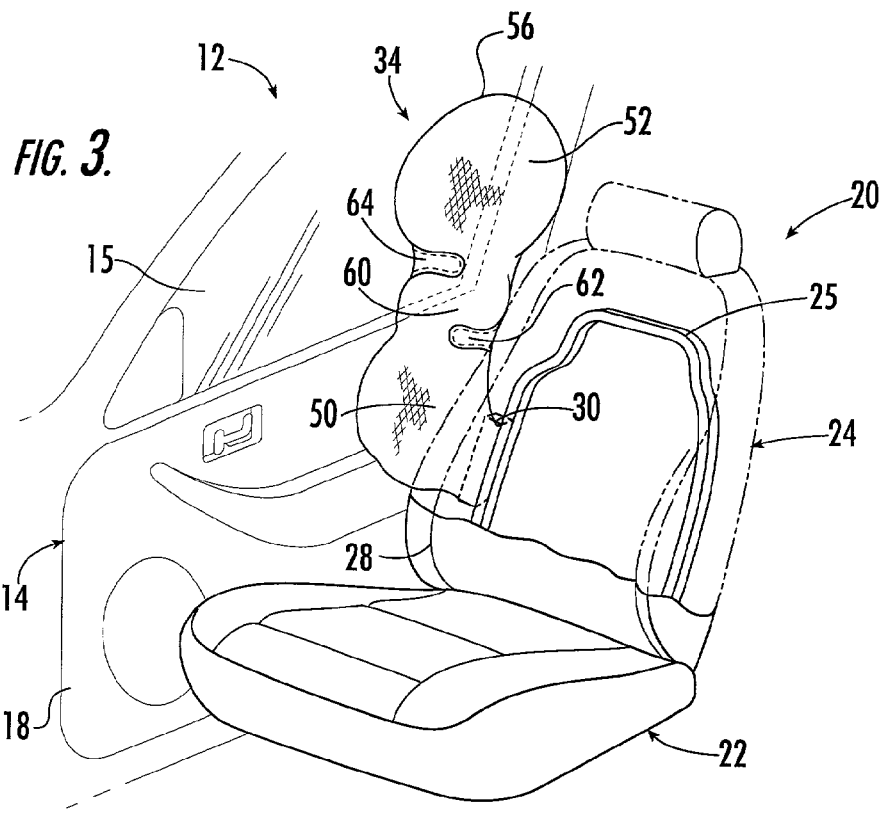
FIG. 3 is a view similar to FIG. 1 but illustrating the air bag assembly in the deployed condition revealing an inflated air bag cushion for side impact protection of a vehicle occupant.

While the invention has been illustrated and generally described above, and will hereinafter be described in detail in connection with certain potentially preferred embodiments and practices, it is to be understood that the foregoing general description as well as the following detailed description and accompanying drawings are exemplary and explanatory only and in no event is the invention intended to be limited thereby. On the contrary, it is intended that the present invention shall extend to all alternatives modifications and equivalents as may embrace the broad concepts of this invention within the true spirit and scope thereof.

DESCRIPTION OF THE PREFERRED EMBODIMENT

Referring now to the drawings, it is seen in FIG. 1 that a vehicle 12 includes a door 14 having a moveable window 15 mounted thereon. The interior of the vehicle 12 includes an inner door panel 18 and a seat 20 for the support of a vehicle occupant (not shown). The seat 20 includes a bottom portion 22 and an upwardly extending back portion 24. The back portion 24 includes a rigid seat frame 25 which is preferably made of metal, and encompassed within the back portion 24. Referring to FIG. 2, the back portion 24 is preferably formed of a foam material 26 covered by a fabric or leather seat material 27. The back portion 24 preferably includes a generally vertically extending seat seam 28 proximate the inner door panel 18.

As illustrated in FIG. 2, the component parts of an air bag module 30 according to the present invention are preferably located within the back portion 24 of the seat 20. However, it will be appreciated that the air bag module 30 may alternatively be mounted anywhere in the vehicle 12. It is contemplated that the air bag module 30 may be especially well adapted to be mounted in various locations within the door 14 or seat bottom portion 22 as well as in the roof, vehicle side structure or instrument panel (not shown).

As illustrated, the air bag module 30 preferably includes an inflator 32, an air bag cushion 34 for inflation upon the discharge of inflating gas by the inflator 32, a housing 36 for containment of the inflator 32 and air bag cushion 34 therein, and a mounting bracket 40 for attachment of the air bag cushion 34 and inflator 32 to the seat frame 25 by appropriate fastening devices such as a bolt 41 and cooperatively attached nut 42 as illustrated. One such bracket assembly as may be utilized is illustrated and described in U.S. Pat. No. 5,803,486 to Spencer et al. issued Sep. 8, 1998, the teachings of which are incorporated herein by reference. However, other appropriate attachment mechanisms as may be known to those of skill in the art may likewise be utilized.

The inflator 32 may be of any suitable construction which discharges a gaseous inflation medium upon the existence of predetermined conditions experienced by the vehicle 12. Such vehicle conditions typically relate to rapid vehicle deceleration as monitored by appropriate sensors (not shown) as are well known to those of skill in the art. The air bag cushion 34 may be made of any suitable material although a textile material of woven or knitted yarns may be preferred. According to a potentially preferred embodiment, the material forming the air bag cushion 34 will be a woven textile formed from nylon or polyester filament yarns wherein such yarns have a linear density in the range of about 105 denier to about 840 denier and wherein the filaments which make up such yarns are characterized by a linear density of about 3 to about 6 denier per filament. It is believed that such textile structure may provide advantages in packaging the air bag cushion 34 within the confines of the housing 36. The material forming the air bag cushion 34 will most preferably be a woven textile structure formed from nylon yarns according to a so-called "rip-stop" weave pattern, although other construction techniques and materials as may be known of skill in the art are also contemplated.

Figure 5:
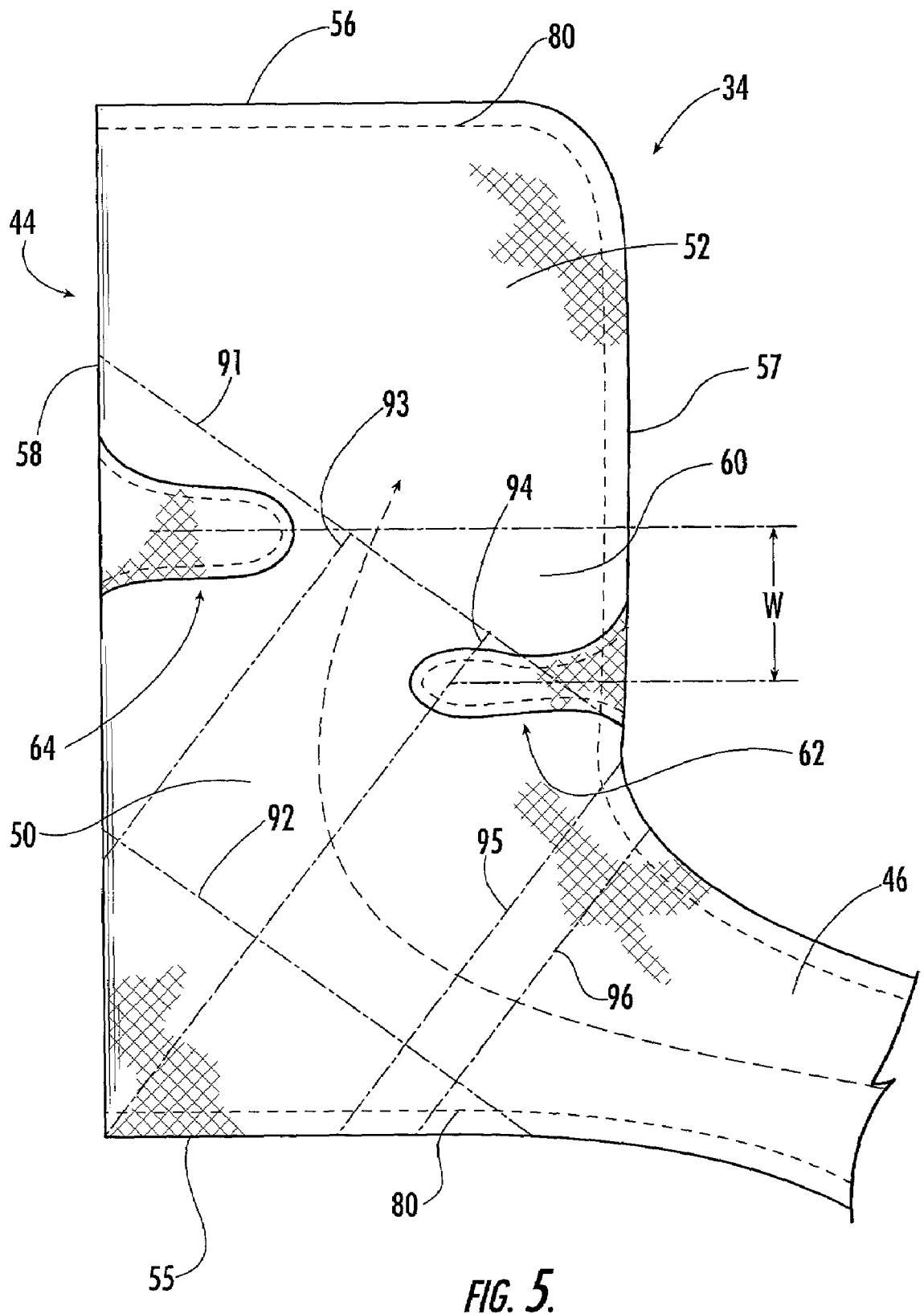
FIG. 5 is a plan view of the air bag cushion formed from the material blank illustrated in FIG. 4 including perimeter seams and expansion restraining tether elements in staggered opposing relation to one another.

As shown through reference to FIGS. 2 and 5, the air bag cushion 34 includes a folded main body portion 44 which is inflatable upon the discharge of inflator gas as shown in phantom lines FIG. 2. The air bag cushion 34 may also include a neck portion 46 which is preferably an extension of the material forming the air bag cushion 34. As illustrated, the neck portion 46 may be disposed in substantially surrounding relation to the inflator 32 such that the path of travel of the inflation gas is through the neck portion 46 and into the main body portion 44 as shown by the directional arrow in FIG. 5.

As best illustrated through reference to FIGS. 3 and 5, the air bag cushion 34 is preferably of a generally elongate configuration having a height dimension extending adjacent to the region occupied by the torso and head of the occupant to be protected and a width dimension which expands to occupy the space between the door panel 18 and the occupant to be protected. According to the illustrated and potentially preferred embodiment, the air bag cushion 34 includes a first inflatable portion 50 for disposition adjacent the torso of the occupant to be protected and a second inflatable portion 52 for protection of the head of the vehicle occupant The air bag cushion 34 comprises an inflatable chamber bounded by a lower boundary 55, an upper boundary 56, a first lateral side 57, and a second lateral side 58. Disposed between the first inflatable portion 50 and the second inflatable portion 52 is an intermediate portion 60. The intermediate portion 60 preferably includes a first expansion restraining element 62 extending latitudinally partially across the width of the air bag cushion 34 from the first lateral side 57. At least a second expansion restraining element 64 preferably extends in offset opposing relation to the first expansion restraining element 62 from the lateral side 58. As shown, the expansion restraining elements 62, 64 are preferably arranged in a staggered configuration in alternating fashion from opposing lateral sides 57, 58.

As illustrated, the first expansion restraining element 62 preferably extends inwardly from the first lateral side 57 which is proximal to the occupant to be protected while the second expansion restraining element 64 extends from the second lateral side 58 which is proximal to the inner door panel 18, the first and second expansion restraining elements 62, 64 are preferably formed through the introduction of connective seams between the layers of material forming the air bag cushion 34 such that the flow of inflation gas is directed around the expansion restraining elements 62, 64 thereby substantially precluding inflatable expansion at the locations of their occurrence. So as to avoid any undue stress concentration, the expansion restraining elements are preferably of a substantially rounded profile.

The inflated character of the air bag cushion 34 will be dependent upon the relative size and position of the expansion restraining elements 62, 64. Specifically, it is believed that adjustment of the longitudinal offset distance "W" between the first and second expansion restraining elements 62, 64 may be utilized to obtain desired expanded profile characteristics. Moreover, the depth of the expansion restraining elements into the interior of the air bag cushion 34 may be used to control the flow path of the inflation gas so as to deploy the air bag cushion 34 in a more efficient manner.

In the illustrated and potentially preferred embodiment, the first expansion restraining element 62 is disposed at a lower position than the second expansion restraining element 64 thereby causing the inflation gas to assume a generally inwardly curving flow path (i.e. towards the occupant to be protected) as it moves from the first inflatable portion 50 of the air bag cushion 34 into the second inflatable portion 52 of the air bag cushion 34. Such an inwardly curving flow path is believed to bring the second inflatable portion 52 into an expanded operative position adjacent the head of the person to be protected in a more efficient manner. Moreover, the presence of the expansion restraining elements 62, 64 permits a more efficient utilization of available inflation gas within the portions of the air bag cushion 34 which are intended to protect the torso and head of the occupant. In addition, due to the partial obstruction of gas flow caused by the first and second expansion restraining elements 62, 64, it is believed that the first inflatable portion 50 will tend to realize full operative expansion at an early stage of activation, thereby providing early protection to the torso of an occupant as is typically desired in a side impact event.

Figure 4:
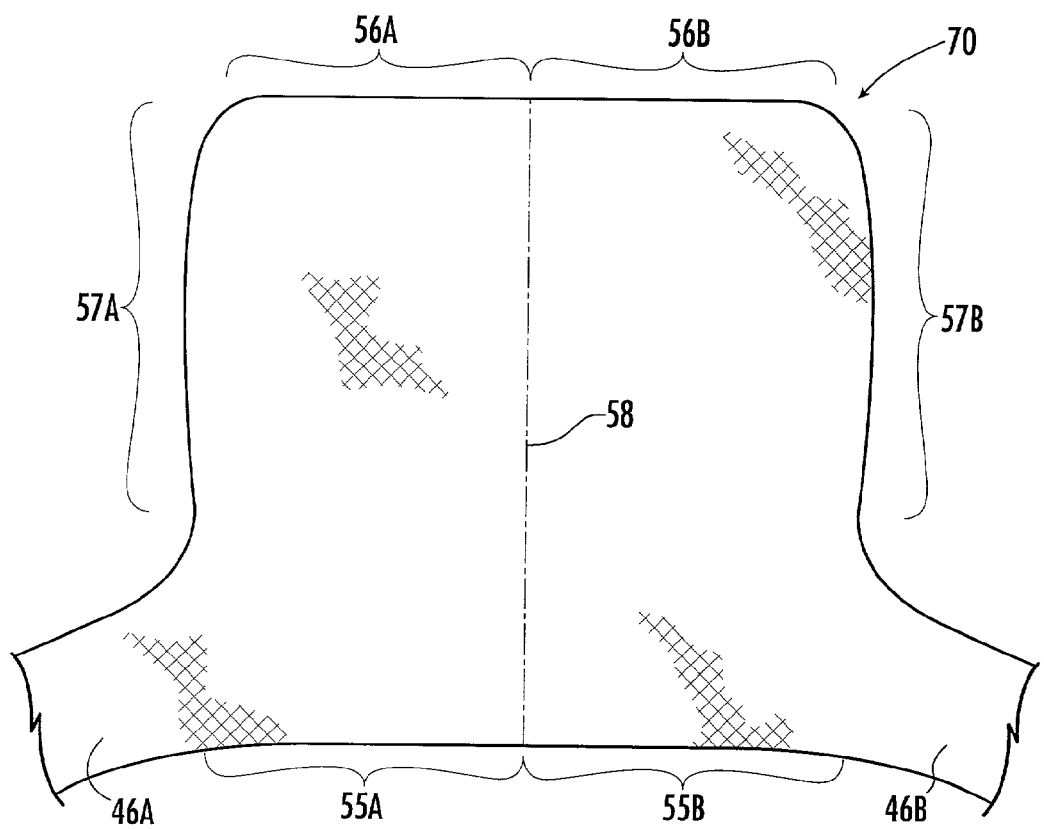
FIG. 4 is an elevation plan view of a material blank for formation of the air bag cushion having a one-piece structure.

According to a potentially preferred aspect of the present invention, it is contemplated that the formation of the air bag cushion 34 and introduction of the expansion restraining elements 62, 64 may be carried out by folding and seaming a single blank of material. As shown in FIG. 4, the blank 70 of material is preferably of a substantially symmetrical configuration such that it may be folded along a centerline corresponding to the second lateral side 58 of the cushion to yield a structure substantially as illustrated in FIG. 5. Upon executing such a folding operation, connective seams 80 are introduced between corresponding edge segments 55A, 55B; 56A, 56B; 57A, 57B around the perimeter of the folded structure. As shown, an opening is preferably permitted to remain at the neck portion 46 of the air bag cushion 34 so as to permit the introduction of inflation gas therethrough. The connective perimeter seams 80 may be formed by any suitable means including, by way of example only, and not limitation industrial sewing, RF welding, ultrasonic welding, adhesive bonding, and combinations thereof.

It is contemplated that the expansion restriction elements 62, 64 may be introduced between the layers of the folded air bag cushion 34 simultaneously with the introduction of the connective perimeter seams 80. Thus, it is contemplated that no additional structural elements will be required to form the expansion restraining elements within the air bag cushion 34. According to the potentially preferred practice, the expansion restraining elements 62, 64 are introduced using the same connective procedures as may be used to apply the connective perimeter seams including industrial sewing, RF welding, ultrasonic welding and adhesive bonding. However, it is also contemplated that the expansion restraining elements 62, 64 may be of different character from the connective perimeter seams 80 if desired.

It is contemplated that it may be desirable in a side impact situation to first provide cushioning protection to the torso of the occupant followed by the provision of protection to the head of the occupant as the event progresses. Thus, it is contemplated that during the initial stages of inflation, the available inflation gas expelled by the inflator 32 will be utilized preferentially within the first inflatable portion 50 of the air bag cushion 34 which protects the torso of the occupant. Inflation gas is thereafter utilized within the second inflatable portion 52 of the air bag cushion 34 during the latter stages of inflation so as to provide protection to the head of the occupant at the appropriate time.

The air bag cushion 34 according to the present invention provides desirable inflation performance characteristics through the configuration and relative placement of the expansion restraining elements 62, 64 between the first and second inflatable portions 50, 52. In this regard it is contemplated that the flow of inflation gas from the first inflatable portion 50 into the second inflatable portion 52 may be controlled by increasing or diminishing the lateral penetration of the expansion restraining elements 62, 64 across the width of the air bag cushion 34 and/or by adjusting the longitudinal offset distance "W" between opposing expansion restraining elements 62, 64. Specifically, in the event that the opposing expansion restraining elements 62, 64 are lengthened and/or are placed in closer proximity to one another, flow between the first inflatable portion 50 and the second inflatable portion 52 will be restricted to a greater degree and the full inflation of the second inflatable portion will tend to take place at a later stage of deployment. Conversely, in the event that the opposing expansion restraining elements 62, 64 are shortened and/or are placed further away from one another, the path of conveyance between the first inflatable portion 50 and the second inflatable portion 52 will be more expansive thereby promoting flow of inflation gas into the second inflatable portion 52 and resulting in the full inflation of the second inflatable portion at an earlier time.

It has been found that the utilization of the offset staggered arrangement for the expansion restraining elements 62, 64 provides substantially enhanced versatility in the control over the deployment profile of the air bag cushion. Such versatility is achieved due to the ability to independently adjust both the size and relative spacing of the expansion restraining elements 62, 64 thereby permitting the intermediate portion 60 between the first inflatable portion 50 and the second inflatable portion 52 to be configured to provide a wide range of gas flow and expansion characteristics as may be desired. As will be appreciated, the utilization of the offset staggered arrangement for the expansion restraining elements 62, 64 provides the added advantage of forming the expansible intermediate portion 60 which may serve to protect the head of an occupant of diminished stature. The air bag cushion 34 may thus be utilized by a wide array of occupants.

Following construction, the air bag cushion 34 is preferably folded into a compact arrangement for storage within the housing 36. This folding operation is preferably performed such that the inflation gas exiting the inflator 32 is readily conveyed into the first inflatable portion 50 for substantial expansion thereof and corresponding protection of the torso of the occupant before deployment of the second inflatable portion 52. Referring to FIG. 5, one such folding operation as may be utilized involves the application of a first fold along a first fold line 91 such that the corner intersection between the upper boundary 56 and the first lateral side 57 is folded towards the first inflatable portion 50. A second fold is thereafter made along a second fold line 92 in substantially parallel relation to the first fold line 91 such that the corner intersection between the lower boundary 55 and the second lateral side 58 is folded inwardly towards the interior of the air bag cushion 34. Following the introduction of folds along first and second fold lines 91, 92, the resultant folded structure is folded towards the neck portion 46 sequentially along a third fold line 93 and a substantially parallel fourth fold line 94. Each of the folds introduced along the first through fourth fold lines 91–94 are preferably of similar nature wherein the outboard portion of the material is folded up and over the fold line. According to a potentially preferred practice, following the introduction of such folds along the first through fourth fold lines 91–94, a reverse tuck is introduced at the location between the neck portion 46 and the first inflatable portion 50. Such a reverse tuck is preferably introduced by folding the previously folded structure up and over a fifth fold line 95 and thereafter tucking the material between the fifth fold line 95 and a sixth fold line 96 in a substantially "Z" profile configuration. Such a folding operation is believed to be useful in conjunction with the staggered offset arrangement of the expansion restraining elements 62, 64 to achieve the desired staged deployment of first inflatable portion 50 followed by the second inflatable portion 52. However, it is to be appreciated that any number of other folding techniques may likewise prove to be useful.

As best illustrated through reference to FIGS. 3 and 5, the utilization of the air bag cushion 34 of single piece construction of the potentially preferred configuration is believed to provide the benefit of having the inflation gas be first directed towards the non-seamed second lateral side 58 and thereafter turning the gas stream towards the seamed portions of the air bag perimeter. It is believed that such an arrangement may promote the stability of the air bag cushion 34 during a deployment event thereby permitting lower weight materials to be utilized in the construction of the material forming the air bag cushion 34 and/or permitting the use of a more aggressive inflator 32.

While the present invention has been illustrated and described in relation to potentially preferred embodiments, constructions, and procedures, it is to be understood that such embodiments, constructions, and procedures are illustrative only and that the present invention is in no event to be limited thereto. Rather, it is contemplated that modifications and variations embodying the principles of the present invention will no doubt occur to those of skill in the art to which the invention pertains. It is therefore contemplated and intended that the present invention shall extend to all such modifications and variations as may incorporate the broad aspects of the present invention within the full spirit and scope of the appended claims and all equivalents thereto.

The invention claimed is:

1. An air bag assembly in a vehicle for side impact protection of a vehicle occupant, the air bag assembly comprising:
   an inflator for discharging a gaseous inflation medium; and
   an air bag cushion including a first inflatable portion proximal to the inflator for cushioning the torso of the vehicle occupant, a second inflatable portion distal from the inflator for cushioning the head of the vehicle occupant, a first expansion restraining element extending partially but not completely across the width of the air bag cushion in substantially nonparallel relation to a flow path of said gaseous inflation medium between the first and second inflatable portions, and at least a second expansion restraining element extending partially but not completely across the width of the air bag cushion in opposing staggered relation to the first expansion restraining element in substantially nonparallel relation to said flow path of said gaseous inflation medium, wherein the expansion restraining elements are adapted to remain operative so as to provide expansion restraint upon full inflation of the air bag cushion without failing such that the expansion restraining elements restrict expansion of the air bag cushion in the region between the first and second inflatable portions.

2. The invention according to claim 1, wherein the expansion restraining elements comprise integral connective seam structures.

3. The invention according to claim 1, wherein the air bag cushion is formed from a single piece of material.

4. The invention according to claim 3, wherein the single piece of material is a woven textile.

5. The invention according to claim 4, wherein the woven textile is formed from a plurality of yarns selected from the group consisting of nylon yarns and polyester yarns and wherein said plurality of yarns have a linear density in the range of about 105 denier to about 840 denier.

6. The invention according to claim 5, wherein the denier per filament of the yarns forming the woven textile is in the range of about 3 to about 6.

7. The invention according to claim 1, wherein the air bag cushion is formed from a substantially flat blank of material which is folded upon itself to form a folded structure having two layers enclosed by the application of connective perimeter seams along the perimeter of the folded structure.

8. The invention according to claim 7, wherein the connective perimeter seams are selected from the group consisting of:
   sewn seams, RF welded seams, ultrasonic welded seams, and adhesive bonding seams.

9. The invention according to claim 7, wherein the expansion restraining elements comprise connective seams extending between the two layers of the folded structure.

10. The invention according to claim 9, wherein the expansion restraining elements have a generally rounded profile.

11. An air bag assembly in a vehicle for side protection of a vehicle occupant, the air bag assembly comprising:
   an inflator for discharging inflation gas; and
   a gas inflatable air bag cushion for deployment adjacent the vehicle occupant wherein the air bag cushion comprises an upper boundary, opposing lateral sides extending away from the upper boundary, and a mouth opening for receipt of the inflation gas, the air bag cushion being formed by folding a single blank of material along a predetermined fold line to form a folded structure of two layers, applying connective perimeter seams around the perimeter of the folded structure, and applying a plurality of expansion restraining elements between the layers of the folded structure wherein said expansion restraining elements extend partially but not completely across the width of the airbag cushion into the interior of the air bag cushion in offset staggered relation from said opposing lateral sides and wherein said expansion restraining elements are adapted to remain operative so as to provide expansion restraint upon full inflation of the air bag cushion without failing.

12. An air bag assembly in a vehicle for side impact protection of a vehicle occupant, the air bag assembly comprising:
an inflator for discharging a gaseous inflation medium; and
an air bag cushion including a first inflatable portion proximal to the inflator for cushioning the torso of the vehicle occupant, a second inflatable portion distal from the inflator for cushioning the head of the vehicle occupant, a first expansion restraining element extending partially but not completely across the width of the air bag cushion in substantially nonparallel relation to a flow path of said gaseous inflation medium between the first and second inflatable portions, and at least a second expansion restraining element extending partially but not completely across the width of the air bag cushion in opposing staggered relation to the first expansion restraining element in substantially nonparallel relation to said flow path of said gaseous inflation medium, wherein the expansion restraining elements are adapted to remain operative so as to provide expansion restraint upon full inflation of the air bag cushion without failing such that the expansion restraining elements restrict expansion of the air bag cushion in the region between the first and second inflatable portions and wherein at least a portion of the expansion restraining elements have a generally rounded profile.

13. The invention according to claim 12, wherein the expansion restraining elements comprise integral connective seam structures.

14. The invention according to claim 12, wherein the air bag cushion is formed from a single piece of material.

15. The invention according to claim 14, wherein the single piece of material is a woven textile.

16. The invention according to claim 15, wherein the woven textile is formed from a plurality of yarns selected from the group consisting of nylon yarns and polyester yarns and wherein said plurality of yarns have a linear density in the range of about 105 denier to about 840 denier.

17. The invention according to claim 16, wherein the denier per filament of the yarns forming the woven textile is in the range of about 3 to about 6.

18. The invention according to claim 1, wherein the air bag cushion is formed from a substantially flat blank of material which is folded to form a folded structure having two layers enclosed by the application of connective perimeter seams along the perimeter of the folded structure.

19. The invention according to claim 18, wherein the connective perimeter seams are selected from the group consisting of:
sewn seams, RF welded seams, ultrasonic welded seams, and adhesive bonding seams.

20. The invention according to claim 18, wherein the expansion restraining elements comprise connective seams extending between the two layers of the folded structure.

* * * * *